(12) United States Patent
Vishik et al.

(10) Patent No.: US 7,849,501 B2
(45) Date of Patent: Dec. 7, 2010

(54) METHODS AND SYSTEMS FOR USING DATA PROCESSING SYSTEMS IN ORDER TO AUTHENTICATE PARTIES

(75) Inventors: Claire Svetlana Vishik, Austin, TX (US); Lalitha Suryanarayana, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1468 days.

(21) Appl. No.: 11/241,847

(22) Filed: Sep. 30, 2005

(65) Prior Publication Data

US 2007/0079136 A1   Apr. 5, 2007

(51) Int. Cl.
*G06F 7/04* (2006.01)
*H04L 29/06* (2006.01)

(52) U.S. Cl. ............... 726/10; 713/186; 705/50; 705/78

(58) Field of Classification Search ................ 713/186; 705/50, 78; 726/10
See application file for complete search history.

(56) References Cited

U.S. PATENT DOCUMENTS

| | | | |
|---|---|---|---|
| 6,005,939 A | 12/1999 | Fortenberry et al. | |
| 6,351,817 B1 | 2/2002 | Flyntz | |
| 6,516,416 B2 | 2/2003 | Gregg et al. | |
| 6,523,012 B1 | 2/2003 | Glassman et al. | |
| 6,609,198 B1 | 8/2003 | Wood et al. | |
| 6,618,806 B1 | 9/2003 | Brown et al. | |
| 6,691,089 B1 | 2/2004 | Su et al. | |
| 6,811,078 B2 | 11/2004 | Workens | |
| 6,816,721 B1 | 11/2004 | Rudisill | |
| 6,842,510 B2 | 1/2005 | Sakamoto | |
| 6,866,586 B2 | 3/2005 | Oberberger et al. | |
| 2004/0260657 A1* | 12/2004 | Cockerham ............... | 705/76 |
| 2005/0177724 A1 | 8/2005 | Ali et al. | |
| 2005/0216773 A1 | 9/2005 | Mitchell et al. | |
| 2006/0069916 A1* | 3/2006 | Jenisch et al. ............ | 713/172 |

OTHER PUBLICATIONS

International Search Report and Written Opinion for the International Application No. PCT/US06/28594 dated Apr. 22, 2008.
"Implementing .NET Passport Authentication in Web Applications," ExtremeExperts, retrieved from the Internet: 222. extremeexperts. com/Net/Articles/ImplementingPassportAuth.aspx, 7 pages, Jun. 2, 2005.

* cited by examiner

*Primary Examiner*—Christopher J Brown
(74) *Attorney, Agent, or Firm*—Toler Law Group (57) ABSTRACT

Methods and systems perform authentication based at least in part of the context of the transaction. In one embodiment, the context can be determined and trigger different rules with regard to access to the information or ability to immediately execute the transaction. In another embodiment, a method can include registering a device as a trusted device. The device can include a biometric input module. Biometric data can be used to authenticate a user, and the user may be requested to resubmit biometric data during the same session. In a further embodiment, a hacker may obtain unauthorized access to a victim's account information. The hacker may not be authenticated because he would not have access to a currently valid credential.

16 Claims, 7 Drawing Sheets

METHODS AND SYSTEMS FOR USING DATA PROCESSING SYSTEMS IN ORDER TO AUTHENTICATE PARTIES

BACKGROUND

1. Field of the Disclosure

The present disclosure relates to methods and systems of using data processing systems, and more particularly to methods, data processing systems, and data processing system readable media for use in order to authenticate parties.

2. Description of the Related Art

Identity management is perceived by managers in some industries as one of the most important technologies to ensure smooth operations of the computer systems. It consistently ranks high in the list of "must-have" applications, especially in organizations that have significant exposure to confidential information from customers, such as financial services organizations.

Multiplicity of identities needed to access various applications and subscriptions, some of them confidential in nature, put significant pressure on users and application developers as well as service providers. Standards bodies, such as OASIS or Liberty Alliance, attempted to address the issue with initiatives supporting standard account representations and federated identity. These approaches do a poor job of protecting the customers and business users from fraud in utilizing their access privileges or payment mechanisms. If valid access credentials are used by a non-authorized party, these standards will not identify the fraudulent nature of the transaction. Identity theft is rampant, and the existing mechanisms do not alleviate the concerns in this area. In order to deal with the consequences of identity theft, legislative initiatives have been proposed. However, legal provisions alone are insufficient to eliminate the threat. Technology will need to be developed to render difficult or impossible the task of assuming another person's identity.

The addition of a new security layer, such as Security Assertion Markup Language (herein, "SAML"), eXtensible Access Control Markup Language (herein, "XACML"), or other similar specifications, does not solve the problem of identity preservation. Hardware-based initiatives, such as Trusted Computing, help address some of the related issues when operations are performed from one authorized and enabled device, but in today's multi-device mobile world, this approach is not sufficient. The identity preservation problem will likely need to be solved at a lower level, not only during the process of communicating identity information to distributed applications, but during the entry of the identity information for authentication. In many situations, identity information cannot be confirmed to be authentic (i.e., whether an online purchaser is using his/her own identity or another's identity information that he/she is not authorized to use). Thus, identity protection at entry time when the user cannot be observed can be important.

Elements used to reduce the likelihood of identity theft have been implemented in various tools, e.g. one-time credit card numbers for e-commerce that are supported by major credit card issuers and strong or multi-factor authentication is part of access control in many environments, especially in banking. Several authentication procedures are available for commercial applications. From simple user identification/password systems, to private/public key encrypted credentials and digital signatures, to additional hardware tokens (e.g., SecureID and smart cards) and even biometrics, access to systems and services is secured in multiple ways.

However, these technologies, as they are implemented in applications, are not foolproof. Moreover, these approaches are application dependent and require additional development for each implementation that adds to the cost of implementing and maintaining the system.

BRIEF DESCRIPTION OF THE DRAWINGS

Skilled artisans will appreciate that elements in the figures are illustrated for simplicity and clarity and have not necessarily been drawn to scale.

DETAILED DESCRIPTION

A mechanism to address secure identification can be propagated to a number of different and varied applications, from credit and money cards to electronic commerce and bill payment, wherein such applications can include software, hardware, firmware, or any combination thereof. Multiple authentication procedures can be combined together seamlessly into a universal authentication schema which can be validated by a central security clearinghouse or potentially a provider of a product (e.g., goods or services). In one embodiment, an authentication procedure can include at least one biometric component with a session time-out feature, so that the possibility of misuse is either significantly reduced or eliminated. The authentication procedure can involve a hardware component, but its nature and implementation can be varied, such as use of a biometric-enabled hardware on a phone, a computer (e.g., a keyboard), a smart card, or even a biometrically enabled cellular phone or personal digital assistant (herein "PDA").

Different methods of authentication can be used within the framework described herein, and credentials can be stored in multiple applications. For the different methods, a credential may only be accessible using a standard mechanism following a request from a registered source, and a one-time substitute credential may be issued by the same mechanism upon validation of the one-time credential.

In a first aspect, a method of performing a transaction can comprise determining a context of the transaction between a provider of a product and a requestor of the product, determining a plurality of rules to be used to authenticate the provider and the requestor based at least in part on the context of the transaction, and authenticating the provider and the requestor based at least in part on the plurality of rules.

In a second aspect, a method of using a data processing system can comprise receiving biometric data from a user during a session and successfully authenticating the user during the session. The method can also include sending a request to the user to resubmit biometric data during the session after authenticating the user.

In a third aspect, a method of using a data processing system can comprise sending account information associated with a first party (e.g., victim of identity theft) from a second party (e.g., a provider) to a third party (e.g., a computer hacker), wherein the third party is not authorized to have access to the account information. The method can include receiving the account information in order to authenticate the first party. The account information is received by the second party from the third party in connection with a transaction request; however, a valid credential associated with the first party is not received by the second party from the third party.

In other aspects, data processing systems can be configured to carry out any part or all of the methods, and the data processing system readable medium can have code with instructions to carry out any part or all of the methods.

A few terms are defined or clarified to aid in understanding of the terms as used throughout this specification. The term "product" is intended to mean an object (e.g., goods) or a service that is provided by a provider. An example of a service can include providing access to information.

The term "provider" is intended to mean a person or an entity that provides a product. An example of a provider can include an employer that can provide access to its internal network to its employees or other agents. Another example of a provider can be a merchant.

The term "requestor" is intended to mean that a person or an entity that desired to obtain a product from the provider.

The term "trusted" is intended to mean that a person or an entity or a device (e.g., personal computer, personal digital assistant, cellular phone, etc.) of such person or entity meets one or more of security qualifications as set by another party. Different levels of trust may exist, with a higher level being granted more access and privileges and a less level being granter less access and privileges, as compared to each other.

The term "user" is intended to mean that a provider, a requestor, or both.

As used herein, the terms "comprises," "comprising," "includes," "including," "has," "having" or any other variation thereof, are intended to cover a non-exclusive inclusion. For example, a process, method, article, or apparatus that comprises a list of elements is not limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, for clarity purposes and to give a general sense of the scope of the embodiments described herein, the use of "a" or "an" are employed to describe one or more articles to which "a" or "an" refers. Therefore, the description should be read to include at least one whenever "a" or "an" is used, and the singular also includes the plural unless it is clear that the contrary is meant otherwise.

Unless stated otherwise, any combination of parts of a system may be bi-directionally or uni-directionally coupled to each other, even though a figure may illustrate only a single-headed arrow or a double-headed arrow. Arrows within the drawing are illustrated, as a matter of convenience, to show a principal information, data, or signal flow within the system or between the system and one or more components outside the system, one or more modules outside the system, another system, or any combination thereof in accordance with an embodiment. Coupling should be construed to include a direct electrical connection in one embodiment and alternatively, may include any one or more of an intervening switch, resistor, capacitor, inductor, router, firewall, network fabric or the like between any combination of one or more components, one or more devices, or one or more modules.

Unless otherwise defined, technical and scientific terms used herein have the same meaning as commonly understood by one of ordinary skill in the art. In addition, the methods and examples disclosed are illustrative only and not intended to be limiting.

Figure 1:
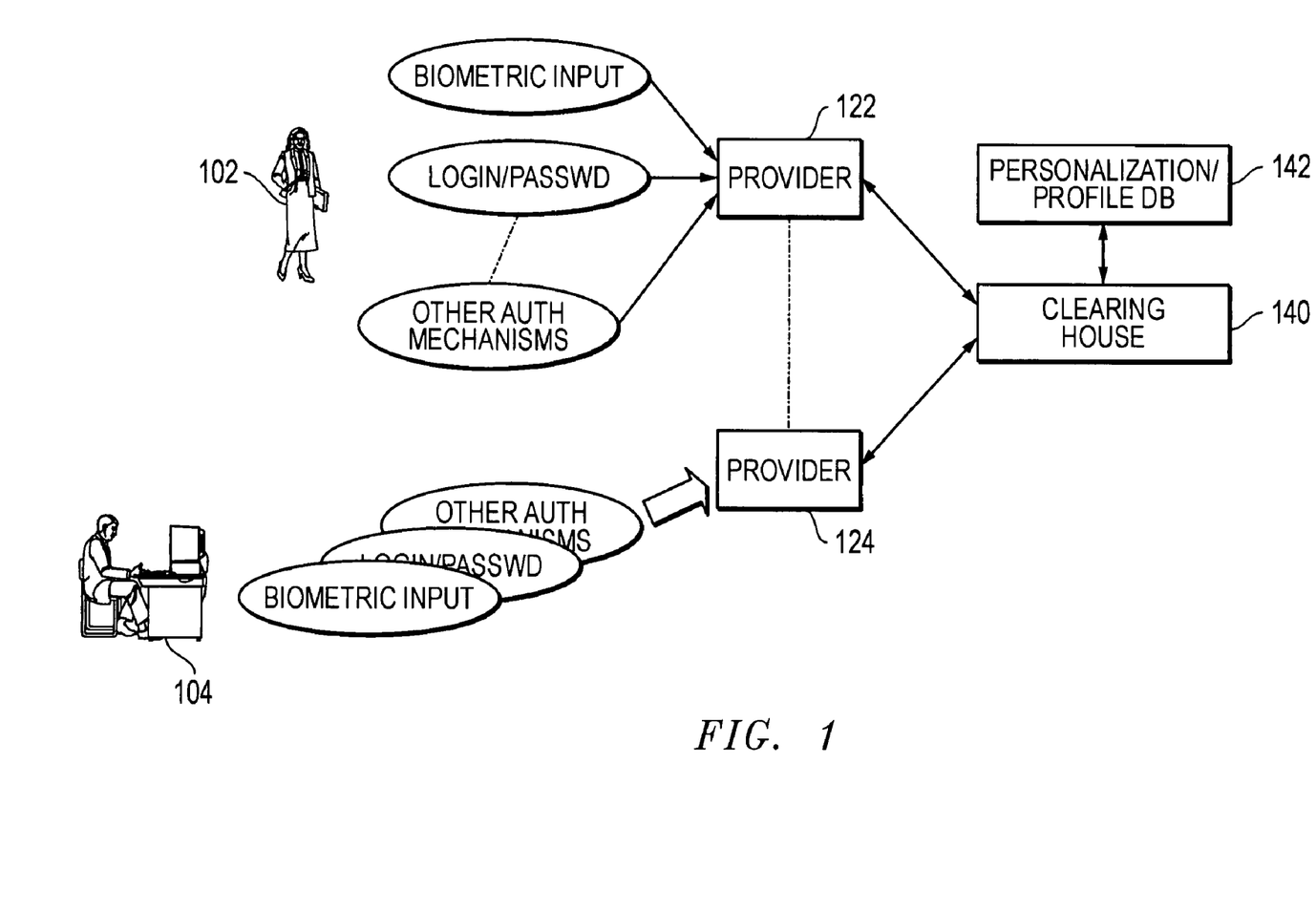
FIG. 1 includes a general diagram of interactions between requesters, providers, and an authentication clearinghouse.

FIG. 1 is a general diagram of interactions between requestors 102, 104, providers 122, 124, and an authentication clearinghouse 140 that is bi-directionally coupled to a database 142. The authentication options that can be used can be maintained by the authentication clearinghouse 140 within the database 142. Detailed information, including personalization and profile information, can also be stored within the database 142. Depending upon the context associated with a transaction, a temporary or permanent credential may be returned. The credential can include a time limit on the validity of approval, a use limit (e.g., one-time credential), an associated security or trust rating, a service level recommendation, a credit rating, other suitable information, or any combination thereof. In one embodiment, a user may be authenticated offline, provided that a previous token has been obtained through an online mechanism or preloaded into a device.

In one embodiment, the authentication procedure can include a combination of a hardware identifier, a biometrics parameter (e.g., reduced (i.e., low bandwidth) fingerprint or speech authentication), and a user identifier/password combination. These credentials may be validated online, using an online identity clearinghouse (e.g., authentication clearinghouse 140), or off-line, on a hardware device that is being used (e.g., a computer used by user 104 or a provider 122 or 124).

Determining the context of a transaction can include determining a security quality level of the requestors 102, 104, the providers 122, 124, or any combination thereof. Regarding the requesters 102, 104, in one embodiment, they may have the best, average, or worst security quality level. For example, for the best security quality level, the requestor 104 may be working at a device that is biometrically enabled and has been registered with the clearinghouse 140, and the requestor 104 may have proper credentials. The best security quality level (meaning that there is a high level of certainty that the systems have not been compromised) can allow the requestor 104 the fullest level of rights and access to products. In a particular embodiment, one or more components used for authentication, such as additional challenges, authentication process steps, or credentials may be bypassed. The challenges can be in the form of requests for additional information.

For the average security quality level, the device used by the requester 104 may not be registered or be biometrically enabled, or the requestor 104 may not have a currently valid credential. The average security quality level can allow the requestor 104 a limited level of rights and access to products. For example, a maximum value for a credit transaction may be limited to $50 to $100. In a particular embodiment, one or more components used for authentication, such as additional challenges, authentication process steps, or credentials may be bypassed; however, such bypassing will not be as extensive as it is for the best security quality level.

For the worst security quality level, the requestor 102 may be a walk-in customer of provider 122 and not have a currently valid credential or the requestor 104 may be at a public computer. The worst security quality level may allow the requestor 102, 104 a restricted level of rights and access to products. For example, no credit transactions may be allowed (e.g., pay at the time of purchase). The requestor 102 may receive one or more challenges when being authenticated. As compared to the average security level, the challenges would be more numerous and less likely to be answered correctly by anyone other than the requestor 102.

The provider 122, 124 can have different security quality levels similar to the requestors 102, 104 having different security quality levels. For example, for the best security quality level, the provider 124 may have a relatively higher reputation level (as compared to other providers), a relatively better prior transaction history (e.g., complies with established procedures all or nearly all of the time, few or no customer complaints, etc. as compared to other providers or any other criteria established in a system), and has the ability to perform most or all of the authentication processes that can otherwise be performed by the clearinghouse 140. Rank, rating, reputation, or any combination thereof can be based on prior history of the participant, as well as a list criteria established by the rating bodies and administrators of the clearinghouse. The best security quality level can allow the provider 124 the fullest level of rights and ability to use the system except that the provider 124 cannot issue credentials.

For the average security quality level, the provider 124 may have a relatively average reputation level (as compared to other providers), a relatively average prior transaction history (e.g., complies with established procedures most of the time, some customer complaints, etc. as compared to other providers), and has the ability to perform some of the authentication processes that can otherwise be performed by the clearinghouse 140. Such authentication processes may be limited to transactions involving less sensitive information or lower value products.

For the worst security quality level, the provider 122 may have a relatively bad or no reputation level (as compared to other providers), a relatively bad or no prior transaction history (e.g., does not or rarely complies with established procedures, many customer complaints, etc. as compared to other providers). Authentications may not be allowed to be performed by the provider 122, and may be performed by the clearinghouse 140.

A combination of context of the requestor 102, 102 and provider 122, 124 may also determine the security quality level. At the highest levels for the requestor a provider, authentication may be minimal with the fullest scope of rights available to requestor and provider. At the other end of the spectrum, the authentication can be a more complex procedure and will provide access to only a small subset of the available functionality and reduce the rights of this requestor, provider, or both. For example, a call to the requestor may be made before a larger credit card transaction (more than $100) clears or a limit on the amount of funds available when accessing online backing system for the worst security quality level. If the requestor's identity is validated in this scenario, a one-time validate credential can be generated that allows the requestor to access predefined features in applications, including access to payment mechanisms such as a credit card.

The security quality can include a plurality of discrete levels (as described herein) or may be a continuum. The security quality can be determined using a score, an ontology, a rank or rating, or another technique. After reading this specification, skilled artisans will be able to determine security quality that meets their needs or desires.

In order to use the system described, a provider is first vetted by the authentication clearinghouse 140 and receives a trusted credential confirming the identity of the provider location. In one embodiment, the credential may be a standard certificate. Similar to the requestor, the provider account can be validated with a soft credential and a hard credential at activation. As used herein, a soft credential may be changed relatively easily, such as a password, and a hard credential may be difficult to change, such as a fingerprint, iris pattern, speech pattern, etc. of a user. Similar to the requester, the provider can establish secure access from one or more identifiable registered devices, such as personal computers ("PCs").

In addition to the valid access, the provider can have a special card processor, keyboard, or other device enabled for the communication with the clearinghouse 140 and capable of processing biometric data input. Internet connectivity can be used for real-time operations.

If desired, the provider can participate in a trust or security ranking program and appear as a top-ranked provider in various searches a potential requestor may perform. Independently of the provider's wishes, the clearinghouse may require more stringent authentication and access procedures for a provider that had violations or fraudulent transactions performed from its terminals. Similarly, requestors that commit violations may lose or be reduced in its trusted status or otherwise be restricted in their access to the providers (e.g., more stringent authentication, less rights, etc.).

A user (requestor or provider) can have multiple authentication methods available to him/her through the clearinghouse 140. Any one or more of the authentication methods can be defined by the user or the administrator at the clearinghouse 140. In one particular embodiment, a requester can define a rule to be used when the requestor is entering a transaction, a provider can define a rule to be used when the provider is entering a transaction, and another party other than the requestor and the provider (e.g., the clearinghouse 140) can define yet another rule. While the user profile can be stored in the database 142 (accessible by the clearinghouse 140), the location of the actual credentials can vary. The clearinghouse 140 has logic for different ways to validate the credentials stored in distributed locations. The clearinghouse 140 can also apply elements of personalization to the transaction, e.g., how much information is to be submitted if biometric credential validation is unavailable.

Figure 2:
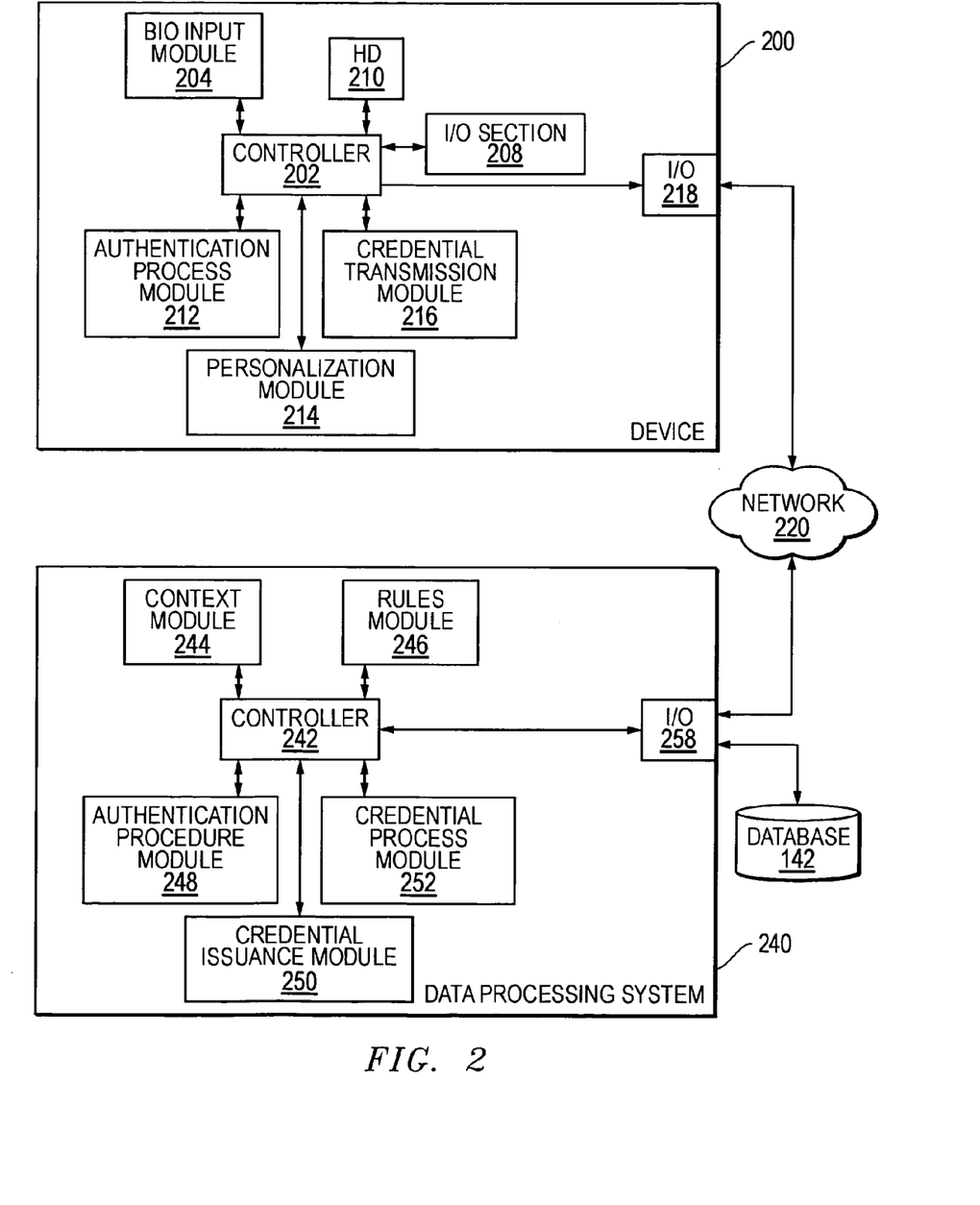
FIG. 2 includes a block diagram illustrating modules and their interaction between a device and a data processing system at the authentication clearinghouse.

FIG. 2 includes a block diagram illustrating modules and their interaction within a device 200 at a user location (requester or provider) and a data processing system 240 at the authentication clearinghouse 140 in accordance with a non-limiting, exemplary embodiment. The device 200 may be at any or all of the users (102, 104, 122, 124). The device 200 can be bi-directionally coupled to a network 220. The network 220 can be a private network (e.g., within an enterprise) or a public network (e.g., the Internet). The data processing system 240 is bi-directionally coupled to the network 220 and the database 142.

The device 200 can be a personal computer, a cellular phone, a PDA, a server, a sales terminal, or the like. The device 200 can include a controller 202 that is configured to control operations within the device 200. In one embodiment, each module within the device 200 can be bi-directionally coupled to the controller 202. In another embodiment (not illustrated), one module may not be coupled directly to the controller 202, but can be bi-directionally coupled to another module that is in turn directly coupled to the controller 202.

The device 200 can also include a bio input module 204, an I/O section 208, a hard drive ("HD") 210, an authentication process module 212, a personalization module 214, a credential transmission module 216, and one or more I/O ports 218.

In one embodiment, the device 200 may not allow a user to use the device 200 unless the user is authenticated. More specifically, the I/O section 208 (e.g., a keyboard, a touchpad, a printer, etc.) may not be activated until the user has been authenticated. For example, the I/O section 208 may include a biometrically-enabled keyboard. When the device 200 is first turned on, the controller 202 may start an authentication procedure that lies in hardware, firmware, or software. In one embodiment, the controller 202 may access HD 210 to obtain the authentication procedure at start up.

The device 200 can request the user for a user identifier and password. The controller 202 can compare the user identifier and password with corresponding information retrieved from the HD 210. The controller 202 may also request the user to input biometric data at the bio input module 204. The biometric data can uniquely identify the user and can include data from a fingerprint, an iris scan, a facial bone structure, a speech pattern, or the like. After the user supplies the biometric data, it can be sent to the authentication process module 212 via the controller 202. The controller 202 can retrieve previously stored biometric data from HD 208 corresponding to the user identifier and send the previously stored biometric data to the authentication process module 212. The authentication process module 212 can compare the biometric data from the bio input module 204 with the previously stored biometric data. The comparison technique may be adjusted to meet the needs or desires of the user. For example, a more rigorous comparison can be made if a high confidence level is used for the comparison or if bandwidth concerns are not an issue. Alternatively, a less rigorous comparison may be used if a lower confidence level can be used or if the device 200 or any of its modules used for authentication have limited bandwidth. If the difference between the biometric data supplied by the user is within a predetermined tolerance of the previously stored biometric data, the two sets of data are considered a match, and the I/O section 208 can be activated.

Controller 202 may obtain one or more personalization files from HD 210 or database 142 via the network 220 and the data processing system 240 (at the clearinghouse 140) that are sent to the personalization module 214. The personalization module 214 can allow the device 200 to be personalized for the user.

In an alternative embodiment (not illustrated), one or more other parts of the device 200 may be activated or allow access to the user, in addition to or instead of the I/O section 208. For example, HD 210 may be partitioned to separate private data (including one or more files that may include credentials) from shared data that other users of the device 200 may access. Alternatively, the credential transmission module 216 may only be activated after the user has been authenticated using the authentication process module 212.

In one embodiment, the authentication process module 212 may or may not be used in conjunction with the rules module 246 within the data processing system 240. For example, an authentication procedure may be determined by the rules module 246 within the data processing system 240 of the clearinghouse 140. The authentication procedure can be sent via the network 220 to the device 200 for the authentication process module 212 to execute in accordance with the authentication procedure.

The credential transmission module 216 may allow credentials to be sent or received by the device 200. In one embodiment, the credentials may be stored within the credential transmission module 216 (rather than in HD 210). Alternatively, the credentials may only be transmitted to any output that is part of the device 200 (e.g., a monitor or a printer) or to or from the device 200 (via I/O 218) under the control (direct or indirect) of the credential transmission module 216.

The data processing system 240 can be at least part of or include one or more of a personal computer, a server, a sales terminal, other suitable machine, or any combination thereof. The data processing system 240 can include a controller 242 that is configured to control operations within the data processing system 240. In one embodiment, each module within the data processing system 240 can be bi-directionally coupled to the controller 242. In another embodiment (not illustrated), one module may not be coupled directly to the controller 242, but can be bi-directionally coupled to another module that is in turn directly coupled to the controller 242. The data processing system 240 can also include a context module 244, a rules module 246, a credential issuance module 250, an authentication process module 252, and one or more I/O ports 258.

In one embodiment, a requestor (102, 104 in FIG. 1) and a provider (122, 124 in FIG. 1) may be trying to enter into a transaction, such as a purchase by the user of a product from the provider. Before completing the transaction, authentication of the requestor, provider, or both may be performed. The data processing system 240 can receive information regarding the transaction. Such information can include the context associated with the transaction. The context can be determined by the context module 244. The context may be associated with a characterization of security measures associated with hardware, software, firmware, or a combination thereof used in carrying out the transaction. The context module 244 can also determine a reputation level of the provider, a transactions history of the provider, authentication procedures that can be performed by the provider, an ability or inability to use biometric data to validate the requester, a credential of the requestor, whether the requestor is using a registered device, or any combination thereof.

An example can include whether the device 200 is a registered device, whether biometric can be used, or the like. A registered device can be a device that can be used to perform an authentication procedure that includes authenticating a party to a transaction based at least in part on a speech pattern, an identifier, and a password of the party. A registered device may be at the requestor's home or business or at the provider.

The context module 244 can also characterization of the transaction. An example can include determining what type of provider is involved or the provider's rank, the type of transaction being contemplated, authentication/access device or the like. An example can include purchasing goods and services from an online retailer, transferring funds from a bank, accessing an account balance with a service provider, or the like.

For example, a requestor may have funds held in escrow if the transaction was initiated from a context that does not guarantee full identity validation, or a requestor entering a transaction from a registered device at home or in the office and having performed biometrics-based authentication can be warned by the clearinghouse 140 that the provider has several violations reported.

Information used by the context module 244 during determining the context can used to personalize a display, content, a constraint, or any combination thereof for other information made available to the requester, the provider, or a combination thereof.

Output from the context module 244 can be routed to the rules module 246. The rules module 246 has logic to determine the appropriate authentication procedure and other rules to be used based at least in part on the context. For example, a user may include a profile that require more stringent measure or more limited rights be granted as compared to a default provide in the database for a similarly situated user. Database 142 can include information regarding contexts, authentication procedures, and other rules. In one embodiment, a authentication procedure and other rules can be determine at least in part based on a particular context. After the particular authentication procedure and potentially other rules are determined, such information can be transmitted to the authentication process module 252 within the data processing system 240 or the authentication process module 212 within the device 200.

The authentication process module 252 can include logic to perform authentication in accordance to the authentication procedure transmitted to it. The logic associated with the authentication process can be stored as code within one or more files in the database 142. Notification of the state of the process (completed-authenticated, completed-not authenticated, in progress, terminated-error, etc.) can be transmitted to the device 200 (via network 220), and optionally, a record can be recorded within the database 142. Depending on the outcome of the authentication process, the transaction may be completed, allowed to proceed further (e.g., obtain authorization from a credit card issuer, etc.), denied or otherwise terminated, or the like.

The credential issuance module 250 can issue credentials after certain procedures, such as authentication, have been performed. A credential can be issued to a user, such as a requestor or a provider, as a permanent credential, a one-time credential, or a credential that can have a timed usage limit but can be used more than one time. The credentials may be stored within database 142, within HD 210 at the device 200 of the user, or other suitable location. In one embodiment, the credentials can only be issued by the clearinghouse 140 to maintain better control over the issuance of credentials to reduce the risk of identity theft or unauthorized acquisition of an active credential (i.e., can still be used to authenticate a party to a transaction).

The issuance of the credentials can also be delegated to trusted third parties (i.e., trusted as deemed by the clearinghouse 140), e.g., certificate authorities in the users' organizations or organizations such as Verisign, Inc. of Mountain View, Calif. can handle the issuance of the certificates while the issuance of biometric-based credentials may be performed in a specially equipped location where enrollment can be certified and monitored. In the case where third parties issue credentials, the clearinghouse 140 can establish one or more secure processes to either import or access credential(s) in the course of a transaction and to supply to the requestor. A provider or requestor may not be able to issue credentials, and therefore, the third parties that can issue credentials may not be a provider or a requestor. Alternatively, the third party can be also be a provider or requester but cannot issue a credential to itself, although the clearinghouse 140 may issue one or more credentials for such third party.

Although not illustrated, other components, connections and memories may reside in or be coupled to the device 200, the data processing system 240, or the like. Such memories can include a hard disk, content addressable memory, static random access memory, cache, first-in-first-out ("FIFO"), a database, a storage network, other memories, or any combination thereof. The memories can include media that can be read by controller 202 of the device 200 or the data processing system 240. Therefore, each of the types of memory includes a data processing system readable medium.

Portions of the methods described herein may be implemented in suitable software code or other data for carrying out the methods described. In one embodiment, computer-executable instructions may be lines of assembly code or compiled $C^{++}$, Java, or other language code. In another embodiment, the code may be contained on a data storage device, such as a hard disk, magnetic tape, floppy diskette, optical storage device, networked storage device(s), or other appropriate data processing system readable medium or storage device.

Functions performed by any one or more of the modules may be combined with one or more other modules within the device 200, the data processing system 240, or the like. For example, the rules module 246 and the authentication process module 252 may be combined into a single module. In still another embodiment, more than one type of module may reside in one or more device. For example, the context module 244, and the rules module 246 may reside within the device 200 in addition to or in place of the data processing system 240. Such modules may be substantially the same or different when compared to each other. Also, any single module may be embedded within a plurality of integrated circuits, chip sets, circuit boards, or the like. Additionally, a software program or its software components with such code may be embodied in more than one data processing system readable medium in more than one computer or other item having a controller or a processor.

A device may be used by a user, wherein the device may include modules from the device 200 or the data processing system 240. The number of types of modules may vary between devices of requestors and providers. For example, a device of a requestor may not include the authentication process module 212, whereas another device of another requestor may include the authentication process module 212. Devices of a requestor may not include the context module 244 and the rules module 246, whereas the devices of the providers may include the context module 244 and rules module 246. After reading the specification, skilled artisans will appreciate that other configurations are possible.

Figure 3:
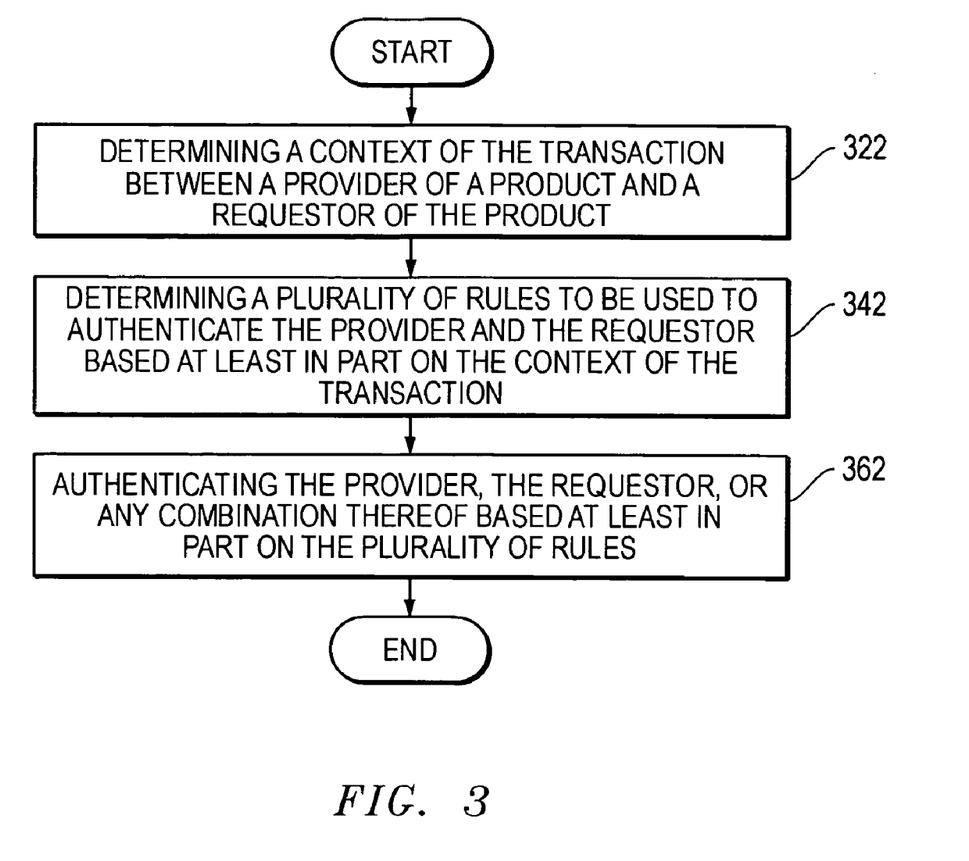
FIG. 3 includes a flow diagram of an exemplary method of authenticating parties to a transaction.

FIG. 3 includes an embodiment that illustrates validation of the credential in accordance with an embodiment. A requester 104 can set credentials to be used with various payment devices, e.g. computer access, credit card payment, and cell phone access that require a biometric measurement confirmed to preset the forms and fill in information. If the authentication request is not accompanied by either validation of biometrics data, the biometrics data itself, or biometric data is otherwise unavailable (e.g., no bio input module 204), the information needs to be filled in from scratch and a one-time limited use credential can be issued. In one particular embodiment, the requestor 104 can provide input in response to a series of prompts at the device 200. For example, the requester 104 can be a person that is performing an e-commerce transaction from a public computer with no biometric support. The clearinghouse 140 will issue a one-time credential in response to correctly filled input forms. After a first request for authentication, a second request for authentication using the same one-time credential will be denied.

The credentials used for the credit card can be maintained at the credit card's issuing bank (an example of a merchant), credentials to access home computers can be stored at an identity provider's database and locally on the requester device, and the cell phone access credentials can be stored locally on the requestor device and in identity management systems of cellular providers (another example of a provider).

A method of using the system as described in FIGS. 1 and 2 can include determining a context of the transaction between a provider of a product and a requestor of the product, at block 322 of FIG. 3. Examples of the context are described herein. The context can be determined by the context module 244. The method can also include determining a plurality of rules to be used to authenticate the provider and the requester based at least in part on the context of the transaction, at block 342. In one embodiment, security quality levels of the provider and the requesters and the type of transaction contemplated can be used in determining the context. In another embodiment, an ontology can be used. In still another embodiment, a scoring technique can be used to determine the rules. The rules can be set by the clearinghouse 140, one or more providers, one or more requesters, one or more third parties that issue credentials, or any combination thereof. For example, the clearinghouse 140 may set default rules and a particular provider or requestor may also have a more stringent rule that an associated default rule. The system is flexible and can allow users to tailor rules that address their particular concerns or sensitivities. Each of the rules can include a policy, an authentication process, or a right that can be exercised by the requestor or the provider. The rules of the requestor and provider can be accessed from the database 142. The rules, which may include an authentication procedure, any number of policies, and any number of rights, can be used during authentication of the provider, requester, or both.

After determining the rules, the method can further include authenticating the provider, the requestor, or any combination thereof based at least in part on the plurality of rules, at block 362. In one embodiment, the clearinghouse 140 may perform the authentication. The authentication can be performed by the authentication process module 252 within the data processing system 240, the authentication process module 212 within the device 200, or both (each of authentication process modules 212 and 252 may perform different parts of the authentication process). In still another, authenticating may be performed by the provider if it has the highest security quality level and can perform the authentication procedures as established by the clearinghouse 140. In this particular embodiment, an authentication of the provider may not be performed because the provider would be authenticating itself. However, the authentication may still be performed, so that the clearinghouse may later audit the provider to determine compliance with authentication procedures. Many variants from the basic method can be performed, some of which are described in more detail.

Figure 4:
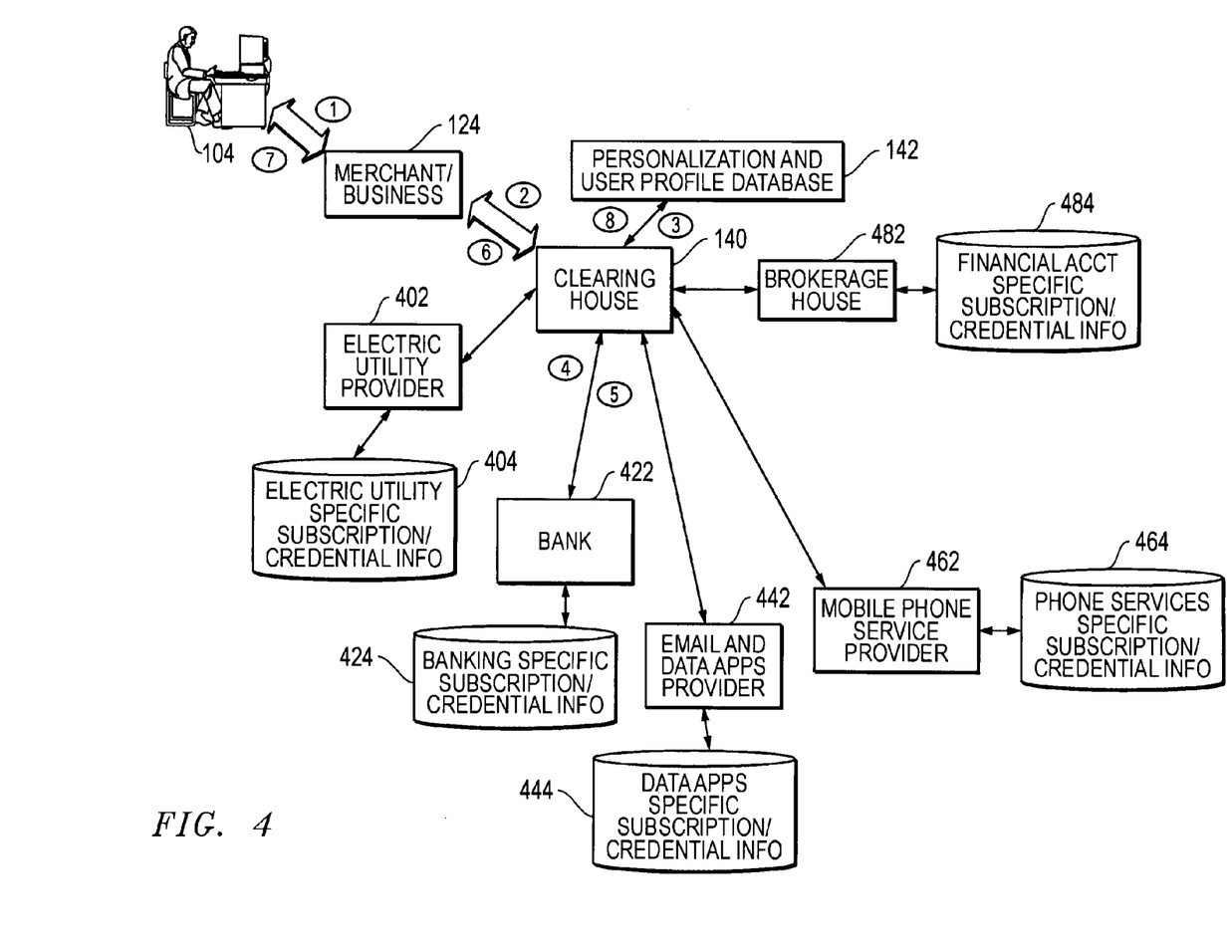
FIG. 4 includes a general diagram illustrating how the authentication clearinghouse can be used with a variety of providers.

FIG. 4 illustrates an embodiment in which a variety of different types of providers can use the authentication clearinghouse 140. For example, provider 124 can be an Internet service provider, provider 402 can be a utility provider (e.g., electric, gas, water, etc.), provider 442 can be an email or data applications provider, provider 462 can be a mobile phone service provider, and provider 482 can be a brokerage house. Any or all of the providers may have their own database (e.g., database 404, 424, 444, 464, 484). In another embodiment, more or fewer types of providers can use the clearinghouse 140, additional providers of the same type (e.g., more than one bank) can use the clearinghouse 140, or any combination thereof.

A non-limiting exemplary method is described with respect to the embodiment as illustrated in FIG. 4. A request, at oval 1, can be sent by the user 104 and received by the provider 124, and the request or a modified form of the request, at oval 2, can be sent from the provider 124 to the clearinghouse 140. The data processing system 240 at the clearinghouse 140 can access personalization, profile, credential, or other information regarding the user 104, provider 124, or both. The request or modified request can be part of a transaction, and the context and situation of the transaction can be determined from the request or modified request.

The request or modified request can be directed to the clearinghouse 140, at oval 3 in FIG. 4, to determine the profile of the user 104, the provider 124, or both. Information can be sent to the rules module 246 within the data processing system 240 to determine a credential management application or other authentication application to be determined in accordance with the profile, at oval 4. The profile can include a table with context and situation entries. In response to the application selected based at least in part on the context and situation, the authentication process module 252 can then run the application.

If the positive authentication is made, at oval 5 in FIG. 4, the information associated with the positive authentication is inserted in a response, together with a one-time credential substitute if such one-time credential is used, at oval 6. The applications at the receiving provider 124 and user 104 are able to recognize the variables representing positive authentication, one-time credentials or both, at oval 7. A log of transactions can be stored by the clearinghouse, at oval 8.

EXAMPLES

The flexibility of the method and system can be further understood by review of the non-limiting examples as described herein. The embodiments as further described in the following examples are meant to illustrate potential uses and implementations and do not limit the scope of the invention.

Example 1

E-Commerce Use from the Home Computer (a Trusted Device)

A user can log into his/her home computer by unlocking the computer with a biometric-enabled keyboard and entering his/her username and password. When the identity is validated at the computer, a signal can be sent to the clearinghouse. The method can include registering information associated with a device (e.g., the home computer) with a third party system (e.g., the clearinghouse), wherein the device includes a biometric input system, at block 502 in FIG. 5. In one embodiment, the user is a requestor and may have previously registered his/her home computer as a trusted device with the clearinghouse. The authentication clearinghouse can issue a credential associated with validation of the user after receiving the registration information. The user account may have been pre-set to enable a secure e-commerce profile when the login is validated from a trusted device (in this case, the home computer), and the trusted device is supported by biometric data.

Figure 5:
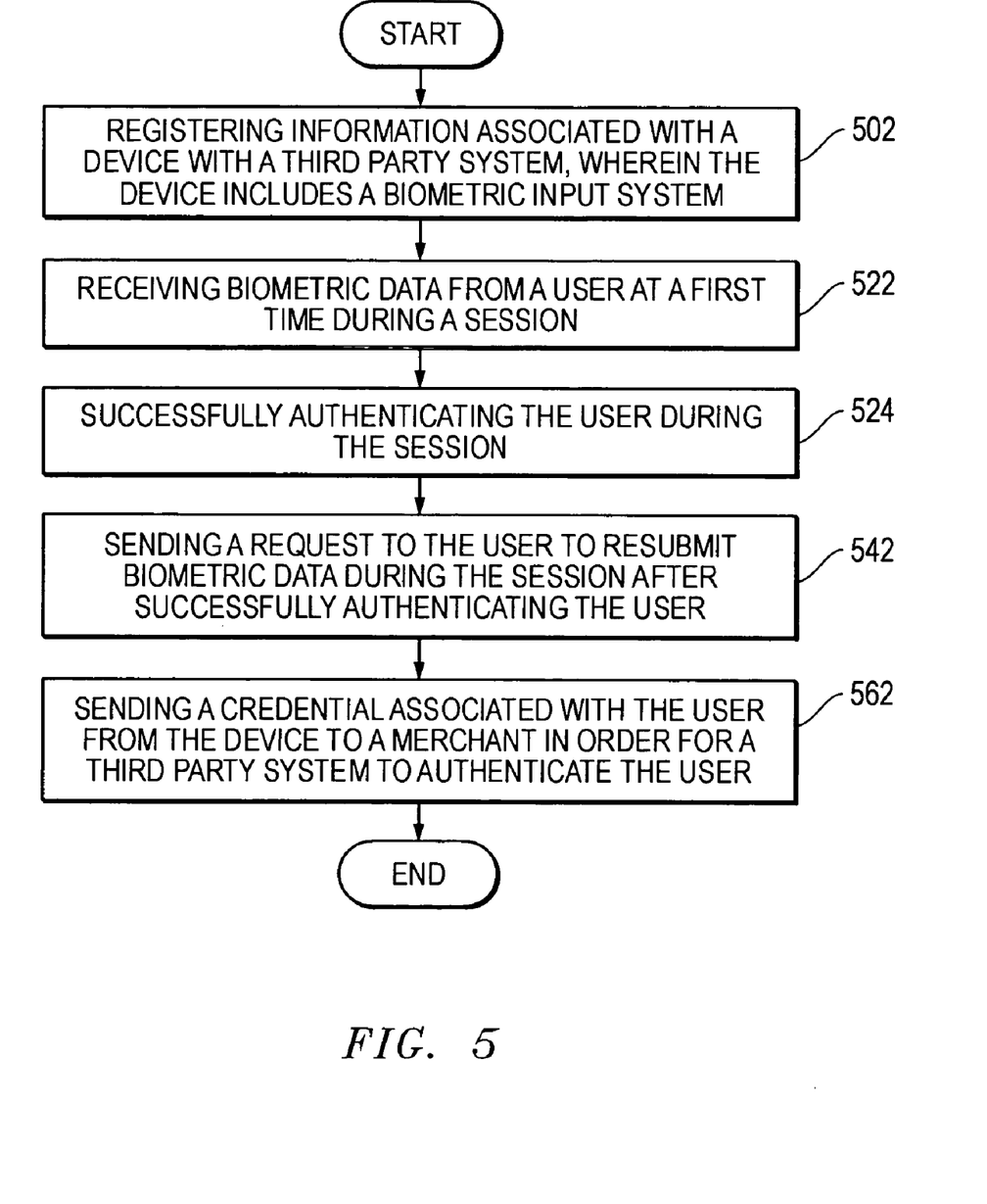
FIG. 5 includes a flow diagram of a method of registering and using a registered device using any one or more of the systems described herein.

The method can include receiving biometric data from a user during a session and successfully authenticating the user at a first time during the session, at blocks 522 and 524, respectively, in FIG. 5. A session can include a time period during which a user uses the device (e.g., 200) or a part of a network (e.g., at a web site), and inactivity by the user, with respect to the device or the part of the network, does not exceed a predetermined time period, for example one hour, 30 minutes, 15 minutes, etc. Alternatively, a session can extend for a predetermined time period starting from when use or access to the device or the part of the network by the user begins. The authentication can be performed by the device 200 (e.g., home computer) or using the clearinghouse 140. This type of login makes it possible for the system to release highly sensitive confidential information in the profiles. The profile may be enabled for a predetermined time period, such as 15 minutes, after the user has passed the authentication process. Note that the predetermined time period for enabling the profile may be same or different as compared to the predetermined time period of inactivity with respect to the session.

For example, if the user is a requester and shopping takes longer, the access may need to be re-validated. The method can further include sending a request to the user to resubmit biometric data during the session after successfully authenticating the user, at block 542. Sending can include displaying the request at device 200 or transmitting the request from the data processing system 240 to the device 200, depending on the configuration. In one particular embodiment, the user may be requested to resubmit biometric data and be re-validated before shopping continues. The authentication processes used for authentication may be different.

For example, the authentication using the first submission of biometric data may be more stringent as compared to the authentication using the second submission of biometric data, or vice versa. In a particular embodiment, the same biometric data can be processed using different techniques. For example, 128-bit processing may be used in authenticating the first biometric data submission and 32-bit processing may be used in authenticating the second biometric data submission. In another embodiment, different biometric data may be used for the different submissions. For example, the first biometric data submission may include a thumbprint and an iris scan, and the second biometric data submission may include a speech pattern. The first and second biometric data submissions may include the different types of biometric data, different portions of biometric data (handprint versus a finger print), different numbers of data (thumbprint and an iris scan for one submission and a speech pattern for another submission), or any combination thereof.

When the user shops on trusted e-commerce sites, his/her forms can be pre-filled with billing and delivery information. While shopping in the trusted environment, the trusted e-commerce sites may already have the users' credit card information before the current session starts, but the credit card transaction will not clear without the additional timed credential communicated in real-time. Therefore, the method can further include sending a credential associated with the user from the device to a provider in order for a third party system to authenticate the user, at block 562. The communications can be encrypted while in transit, and the credential can be hashed.

In a particular embodiment, the device 200 can receive a credential associated with validation of the requestor at an entry point for the device 200 in order for the requester to perform a plurality of different transactions, including a first transaction, with a plurality of different providers, including a first provider. The process can include evaluating the credential from the entry point for a first time before the first transaction between the requestor and the first provider is completed, wherein evaluating for the first time is performed after receiving the credential and before authenticating the requester. At a later time, another transaction between another provider and the requestor may be contemplated. The process can further include evaluating the credential from the entry point for a second time after the first transaction is completed and before the later transaction between the requestor and the other provider is completed. More transactions with the same or other additional providers can be completed using the same credential.

In another particular embodiment, the situation can be that the requester desires to purchase a product or a service using an Internet site of the provider. The credential can be received by the provider from the user when entering into the transaction, and the credential may only be valid for a predetermined time period.

In another embodiment, the roles of the requestor and provider may be switched. The provider may be interacting with a number of different requesters and may need to submit and resubmit biometric data from a representative of the provider during the same session.

Example 2

In a Restaurant

A requestor can pay for a meal at a restaurant where he/she had not been before. A card reader at the restaurant may be biometrically enabled, and the requestor authorizes the transaction by supplying a fingerprint or other biometric data and authorizing a one-time issuance of a credential to be valid for a predetermined time period, such as 5 minutes. If the biometrically enabled equipment is unavailable, the requestor can use a cell phone with voice authentication capability, enter a user identifier and password, and after passing the voice authentication test, then a one-time credential using the predefined code can be requested. The clearinghouse verifies identity, and issues a short-term credential because the restaurant is not on the list of trusted sites. After the credential is appended to credit card information and verified, the credit card information can be forwarded to the credit card clearinghouse to complete the transaction.

In a particular embodiment, the context can include an entity that has not been previously registered, and the situation is that the requestor is at the provider's location and desires to enter into a transaction with the provider. The clearinghouse can issue a one-time credential at least partly in response to the requester providing biometric data. The provider can receive a user identifier, password and the one-time credential when sending information regarding the transaction to the authentication clearinghouse.

Example 3

Hot Spot Access

The requestor detects a wireless hot spot at an airport or public location. The hot spot provider is among the supported providers. The requestor goes through the verification process including supplying biometric data (with a keyboard or smart card) and sends the verification information to the clearinghouse using the hot spot connectivity. The clearinghouse validates the identity and sends payment authorization to the hot spot provider enabling access. Another verification may be used if the requestor chooses to use a virtual private network for access to the corporate network.

Example 4

Access to Corporate Discounts

The requestor is making an online reservation from a kiosk that includes a public computer. The requester uses the cell phone as described herein to request authorization and validate authentication. He/she uses the code for one-time authorization from the public computer; consequently, no files are cached or stored on disk after the transaction is completed.

After the identity is validated, a credential is sent to the requestor's cell phone to be added to the login information. The requestor logs in from the clearinghouse portal, using the corporate profile, and completes the trip reservations. He/she can be automatically assigned the negotiated discounts of his employer.

Example 5

Access to a Trusted Provider from a Public Computer

A requestor logs into an e-commerce system from a public computer. Although the provider in question is a trusted site for the requestor performing the transaction, the login is not biometrically enabled and is not initiated by a private device. Therefore, the information from the confidential profile is not released, and the requestor fills out the forms (they are not pre-filled). A set of predefined secret questions or requests for information is put to the requestor and if he/she answers the questions or otherwise provides proper input successfully, a one-use limited time credential is issued to enable the completion of the transaction. A mechanism at the trusted provider's site causes the browser to clear the cache after the transaction is terminated.

The method and system described herein can be used to identify some scenarios where attempts at malicious use are rejected by the system. In one scenario, an individual obtains the login to the identity clearinghouse portal for a requestor. He/she logs in at a device, such as one similar to a device used by the requestor or at a device at a provider, but a biometrically-supported credential will not be issued because the individual cannot supply the proper biometric data that corresponds to the requestor. In this case, additional information will be supplied at login time formulated in a way that will unlikely be anticipated by a fraudulent requestor. The individual's connection can be terminated. In another scenario, an employee in a restaurant attempts to use a customer's credit card information and issued credential for another transaction. The credential may have been issued for one-time use and cannot be reused.

In still another scenario, a hacker obtains a requestor's credit card information from breaking into one of the trusted e-commerce sites. The method can include sending account information associated with a first party (e.g., a victim of identity theft) from a second party (e.g., a provider) to a third party (e.g., a computer hacker) that is not authorized to have access to the account information, at block 602 in FIG. 6. The method can further include receiving the account information in order to authenticate the first party (e.g., the victim), wherein a valid credential associated with the first party is not received by the second party (e.g., the provider) from the third party (e.g., the computer hacker), at block 622. Unknown to the provider, a computer hacker is attempting to use someone else's account to make a purchase.

Figure 6:
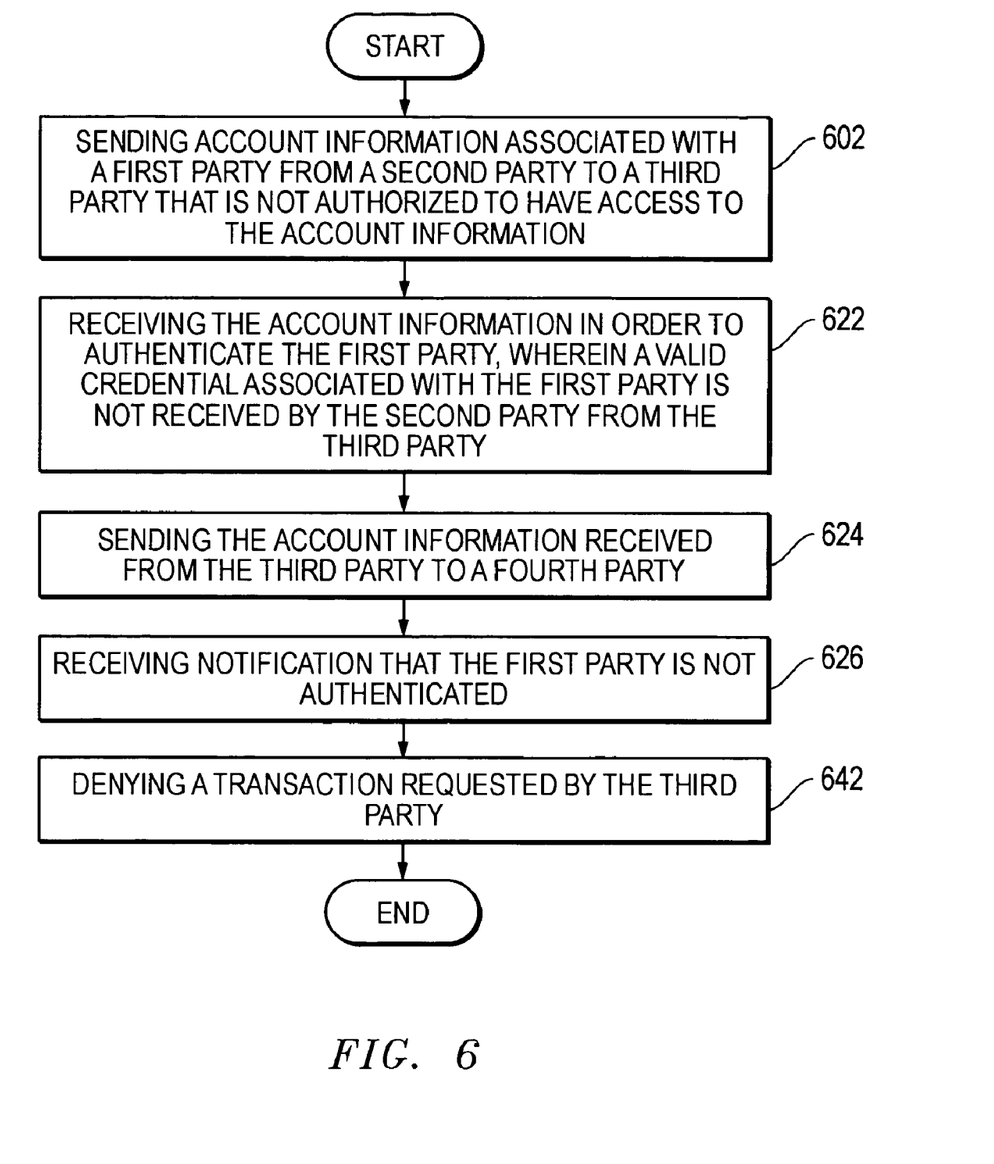
FIG. 6 includes a flow diagram of a method that illustrates how an unauthorized person (e.g., a computer hacker) is not authenticated, even if the computer hacker has a victim's account information.

The method can also include sending the account information received from the third party (e.g., computer hacker) to a fourth party (e.g., the clearinghouse), at block 624. The fourth party is to perform an authentication procedure. In one embodiment, only the clearinghouse can issue valid credentials, not the requestor, the provider, or the computer hacker. The valid credentials for the requestor may not be stored at the provider's location. Thus, a valid credential associated with the first party is not sent to the fourth party by the second party. Even if a credential is sent, it would likely be invalid, for example, reusing a previously used one-time credential, a time limit on the credential has expired, or a combination thereof. The first party will not be successfully authenticated. The method can further include receiving notification that the first party is not authenticated, at block 626. The notification can be received at least in part because a valid credential associated with the first party (e.g., the victim) was not received by the fourth party (e.g., the clearinghouse). The method can also include denying the transaction requested by the third party, at block 642. The denial may occur at least because the first party was not successfully authenticated. Because the first party is not authenticated, the second party (e.g., the provider) does not need to further process the transaction for payment. Still, the system may be configured such that when any authentication fails, a notification may be transmitted to the requester, to one or more institutions associated with the account information (e.g., an issuing bank for a credit card, the credit card company (e.g., VISA, Discover, American Express, etc.), etc.).

Thus, the method and system described herein may not allow a hacker to complete any transactions because he cannot issue additional credentials or have the provider issue additional credentials because the clearinghouse may be the only party that can issue credentials.

Embodiments described herein can allow an administrator and users to more accurately validate the identity of a user at the entry point of any transaction and maintain one identity that could be used for multiple transactions and settings and can also support personalization. Strong authentication procedures can be application based. The method and system can significantly reduce fraudulent use of identity at an entry point after the first transaction, even in relatively low security environments.

Note that not all of the activities described above in the general description or the examples are required, that a portion of a specific activity may not be required, and that one or more further activities may be performed in addition to those described. Still further, the order in which activities are listed is not necessarily the order in which they are performed.

Any one or more benefits, one or more other advantages, one or more solutions to one or more problems, or any combination thereof have been described above with regard to one or more particular embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

Figure 7:
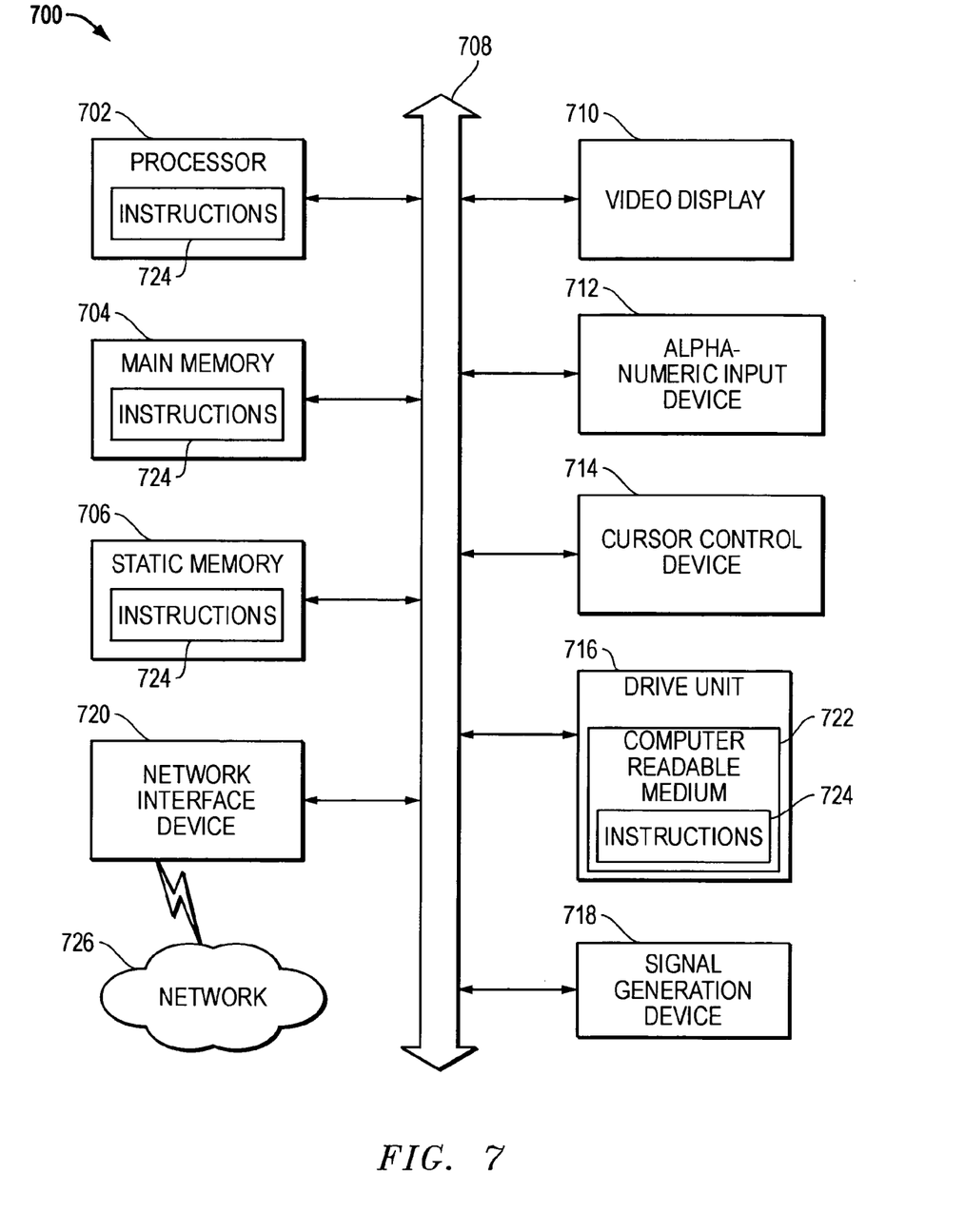
FIG. 7 is a diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706, that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   determining, at a computer comprising a processor, a context of a transaction between a provider of a product and a requestor of the product, wherein determining the context of the transaction comprises determining that the provider has not been previously registered and determining that the requestor is at a location associated with the provider;
   receiving a user identifier, a password, and biometric data from the requestor at the computer via a mobile biometrically-enabled device;
   determining a plurality of rules to be used to authenticate the provider and the requestor based at least in part on the context of the transaction;
   authenticating the provider, the requestor, or any combination thereof based at least in part on the plurality of rules; and
   issuing a one-time credential to the requestor at least partly in response to receiving the biometric data from the requestor.

2. The method of claim 1, wherein the product includes an object, a service, or a combination thereof.

3. The method of claim 1, wherein determining the context comprises:
   determining a first security quality level of the provider; and
   determining a second security quality level of the requestor.

4. The method of claim 1, wherein:
   determining the context comprises determining that the biometric data is unavailable or will not be used to authenticate the requestor; and
   authenticating comprises:
      providing a series of prompts to solicit input from the requestor; and
      receiving a one-time credential in response to input from the requestor.

5. A data processing system comprising a processor and a non-transitory storage medium that includes instructions executable by the processor, the non-transitory storage medium including:
   a context module to determine a context of a transaction between a provider of a product and a requestor of the product, wherein determining the context of the transaction comprises determining that the provider has not been previously registered and determining that the requestor is at a location associated with the provider;
   a credential transmission module to receive a user identifier, a password, and biometric data from the requestor via a mobile biometrically-enabled device;
   a rules module to authenticate parties to the transaction based at least in part on the context; and
   an authentication process module to perform authentication based at least in part on the rules and to issue a one-time credential to the requestor at least partly in response to receiving the biometric data from the requestor.

6. The data processing system of claim 5, wherein the context module is configured to determine a first security quality level of the provider and a second security quality level of the requestor.

7. The data processing system of claim 6, wherein the context module is configured to determine:
   a reputation level of the provider;
   a transactions history of the provider;
   authentication procedures that can be performed by the provider;
   an ability or inability to use biometric data to validate the requestor;
   a credential of the requestor;
   whether the requestor is using a registered device; or
   any combination thereof.

8. The data processing system of claim 5, wherein the credential transmission module is operable to send or receive a credential to be used to authenticate the provider or the requestor.

9. The data processing system of claim 5, wherein information used during determining the context is used to personalize a display, content, a constraint, or any combination thereof of other information made available to the requestor, the provider, or a combination thereof.

10. A data processing system including a non-transitory computer readable medium having data embodied therein, the data comprising instructions executable by a processor to:
   an instruction to determine a context of a transaction between a provider of a product and a requestor of the product, wherein determining the context of the transaction comprises determining that the provider has not been previously registered and determining that the requestor is at a location associated with the provider;
   receive a user identifier, a password, and biometric data from the requestor via a mobile biometrically-enabled device;
   determine a plurality of rules to be used to authenticate the provider and the requestor based at least in part on the context of the transaction;
   authenticate the provider and the requestor based at least in part on the plurality of rules; and
   issue a one-time credential to the requestor at least partly in response to receiving the biometric data from the requestor.

11. The data processing system of claim 10, wherein the product includes an object, a service, or a combination thereof.

12. The data processing system of claim 10, wherein the instructions to determine the context are executable by the processor to:
   determine a first security quality level of the provider; and
   determine a second security quality level of the requestor.

13. The data processing system of claim 10, wherein:
the instructions to determine the first security quality level are executable by the processor to:
  determine a reputation level of the provider;
  review a transactions history of the provider;
  determine which authentication procedures can be performed by the provider;
  and
the instructions to determine the second security quality level are executable by the processor to:
  determine whether biometric data can be used to validate the requestor;
  determine whether a credential of the requestor is correct;
  determine whether the requestor is using a registered device.

14. The data processing system of claim 10, wherein the plurality of rules comprises:
  a first rule that is defined by the provider;
  a second rule that is defined by the requestor; and
  a third rule that is defined by a party other than the provider and the requestor.

15. The data processing system of claim 10, wherein each rule within the plurality of rules comprises a policy, an authentication process, or a right that can be exercised by the requestor or the provider.

16. The data processing system of claim 10, wherein each of the provider and the requestor is acting on behalf of a business entity, an organization, or a governmental agency.

* * * * *